(12) United States Patent
Miyasaka

(10) Patent No.: US 7,347,238 B2
(45) Date of Patent: Mar. 25, 2008

(54) PNEUMATIC TIRE WITH TREAD INCLUDING CHAMFER PORTIONS

(75) Inventor: Atsushi Miyasaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 129 days.

(21) Appl. No.: 10/534,019

(22) PCT Filed: Nov. 6, 2003

(86) PCT No.: PCT/JP03/14143

§ 371 (c)(1),
(2), (4) Date: May 5, 2005

(87) PCT Pub. No.: WO2004/041556

PCT Pub. Date: May 21, 2004

(65) Prior Publication Data

US 2006/0011279 A1    Jan. 19, 2006

(30) Foreign Application Priority Data

Nov. 6, 2002    (JP)    ............................. 2002-322834

(51) Int. Cl.
*B60C 11/11*    (2006.01)
*B60C 11/12*    (2006.01)

(52) U.S. Cl. .......................... 152/209.15; 152/209.18; 152/209.21; 152/DIG. 3; 152/902; 152/903

(58) Field of Classification Search ........... 152/209.15, 152/209.18, 209.21, 209.24, DIG. 3, 902, 152/903
See application file for complete search history.

(56) References Cited

U.S. PATENT DOCUMENTS 4,926,919 A * 5/1990 Hopkins et al. ....... 152/DIG. 3

5,109,903 A    5/1992    Watanabe et al.
5,658,404 A *  8/1997    Brown et al. .......... 152/209.21
5,954,107 A    9/1999    Kuze et al.
5,964,267 A * 10/1999    Poque et al. ............. 15/209.21
6,079,464 A *  6/2000    Hatakenaka et al. ... 152/209.24

(Continued)

FOREIGN PATENT DOCUMENTS

EP    0 602 989 A1    6/1994

(Continued)

*Primary Examiner*—Steven D. Maki
(74) *Attorney, Agent, or Firm*—Sughrue Mion, PLLC

(57) ABSTRACT

A pneumatic tire having improved wet performance without sacrificing steering stability. A pair of central circumferential main grooves 14 and a pair of side circumferential main grooves 16 are arranged on a tread 12, to obtain a fundamentally high level of wet performance. A plurality of central land portion row lateral grooves 20 is formed at both sides of a central land portion row 18 to be spaced away from each other substantially at a constant distance, to enhance wet performance. Central land portion row chamfer portions 24 are formed at obtuse angle portions of the central land portion row 18. The central land portion row chamfer portions 24 drain water between a tread surface and a ground-contact surface into the respective central circumferential main grooves 14 adjacent thereto, whereby wet draining performance is enhanced. Drainage is conducted by the central land portion row chamfer portions 24, so that it is unnecessary to use multiple central land portion row lateral grooves 20, thus making it possible to secure land portion rigidity of the central land portion row 18, and also steering stability.

14 Claims, 10 Drawing Sheets

U.S. PATENT DOCUMENTS

| | | | |
|---|---|---|---|
| 6,986,372 B2 * | 1/2006 | Below | 152/209.15 |
| 2002/0026972 A1 * | 3/2002 | Ochi | 152/209.28 |
| 2005/0211353 A1 * | 9/2005 | Bogenschuetz et al. | 152/209.1 |

FOREIGN PATENT DOCUMENTS

| | | | |
|---|---|---|---|
| EP | 890457 | * | 1/1999 |
| JP | 02-095903 | * | 4/1990 |
| JP | 02-114006 | * | 4/1990 |
| JP | 2-179508 A | | 7/1990 |
| JP | 11-091315 | * | 4/1999 |
| JP | 11-091315 A | | 4/1999 |
| JP | 11-334320 | * | 12/1999 |
| JP | 2000-043511 A | | 2/2000 |
| JP | 2000-142033 A | | 5/2000 |
| JP | 2000-280713 A | | 10/2000 |
| JP | 2001-146104 | * | 5/2001 |
| JP | 2002-293109 | * | 10/2002 |
| WO | WO 03/013881 | * | 2/2003 |

* cited by examiner

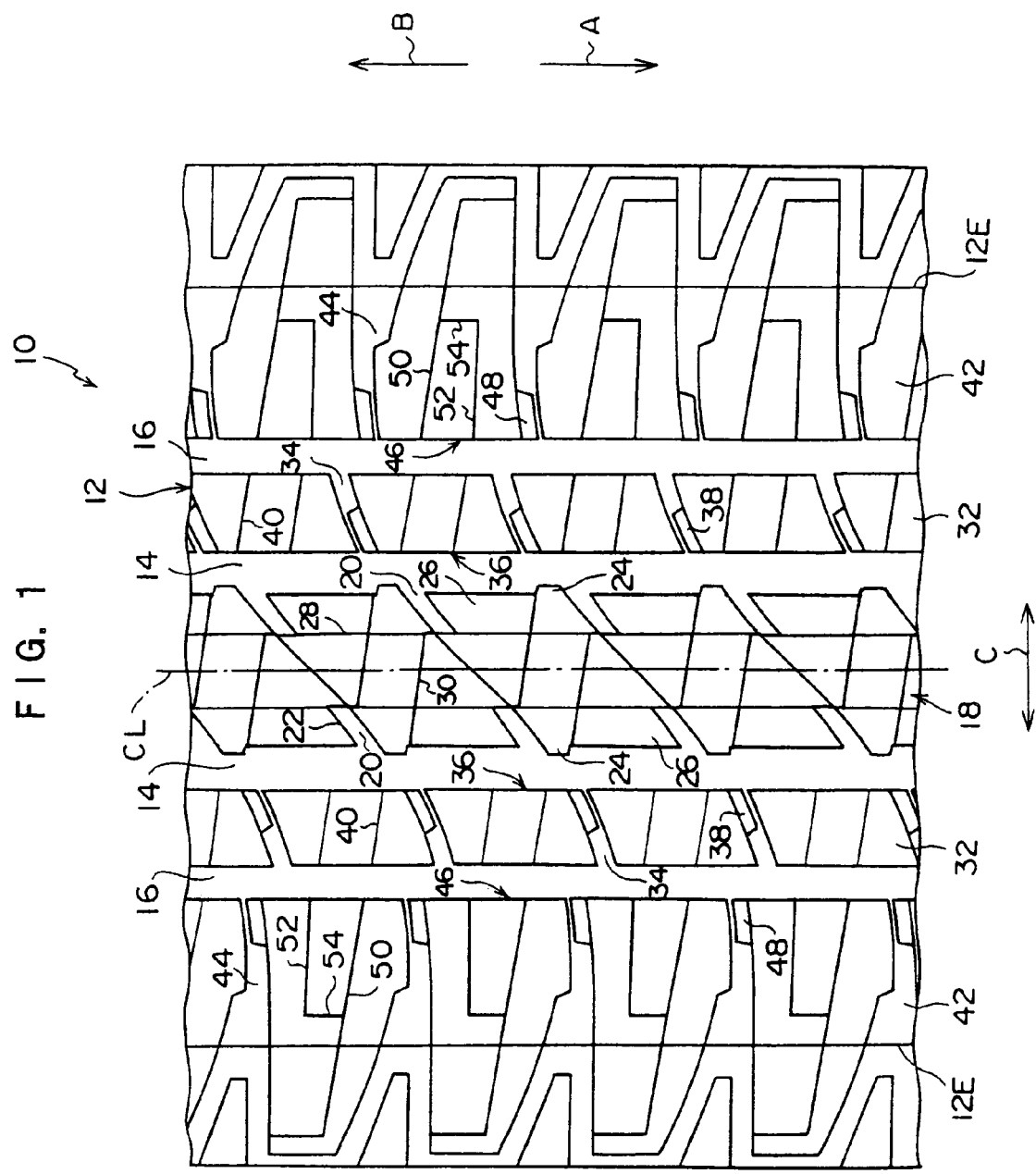

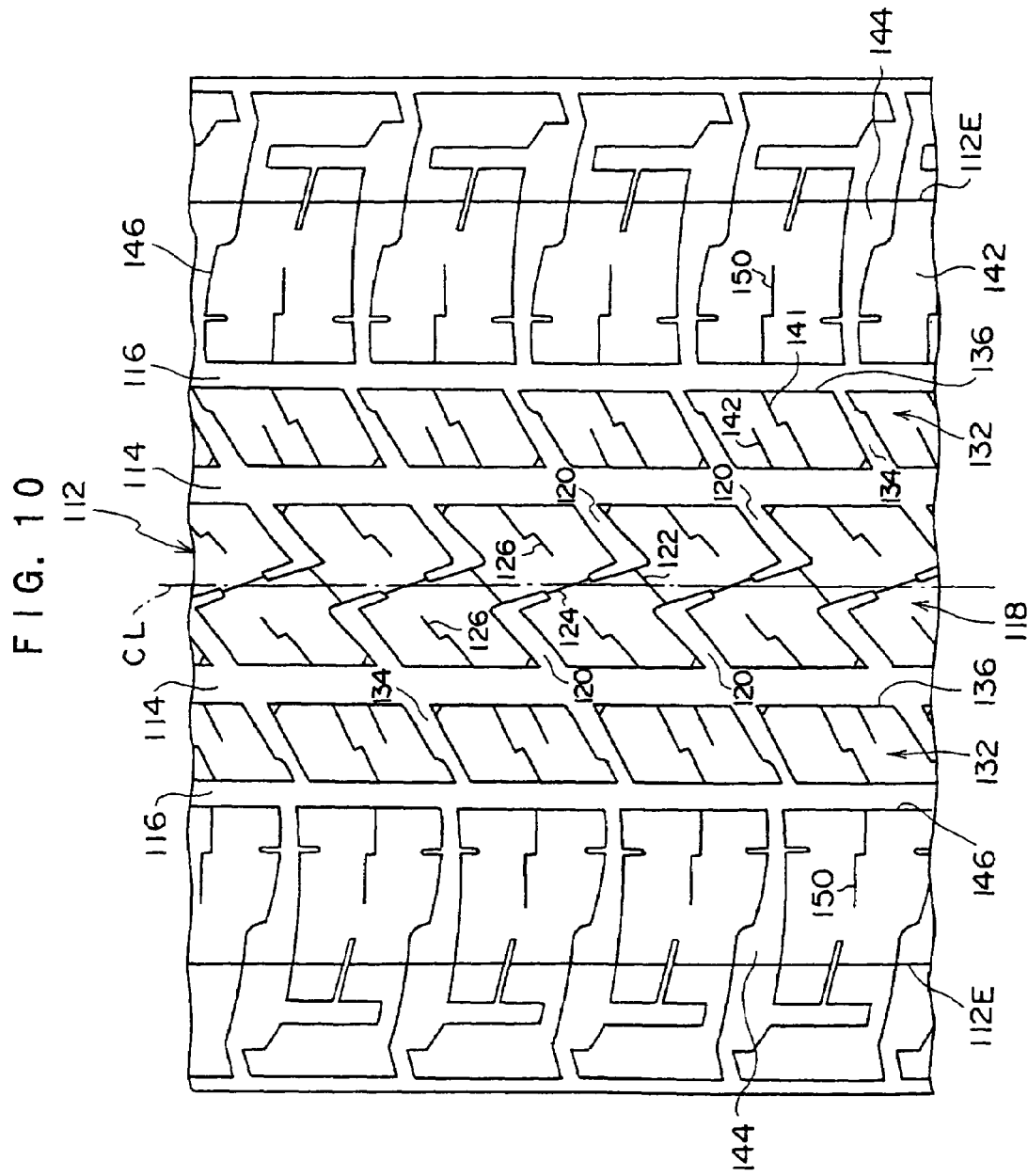

ized along the tire circumferential direction of the tread and the tread is defined into at least the central land portion row at the tire equatorial plane side and the bilateral land portion rows disposed at the tire axial direction outer sides of the central land portion row, whereby fundamental wet performance is obtained.

PNEUMATIC TIRE WITH TREAD INCLUDING CHAMFER PORTIONS

TECHNICAL FIELD

The present invention relates to a pneumatic tire, and more particularly to a pneumatic tire in which wet performance is enhanced without sacrificing steering stability.

BACKGROUND ART

Circumferential main grooves are formed on a tread of a pneumatic tire in order to obtain wet performance.

It is known that a center rib pattern tire having a center rib that extends along a tire circumferential direction on the tire equatorial plane is more excellent in steering stability performance than a center group pattern tire having grooves in the circumferential direction on the tire equatorial plane.

When the width of a center rib (i.e., central land portion row) is further made larger, although steering stability of the tire is enhanced, conversely, wet performance is deteriorated.

Thus, relating to a passenger car, a light truck or the like, a tire having lateral grooves formed on a center rib is generally used in order to prevent deterioration of wet draining performance (for example, Japanese Patent Application Laid-Open (JP-A) No. 11-91315) However, when a lot of lateral grooves is used for the center rib in order to enhance wet draining performance, a problem is caused that land portion rigidity of the center rib is deteriorated thus deteriorating steering stability.

In other words, in a conventional art, it has been difficult to allow steering stability and wet performance to coexist.

In view of the aforementioned facts, an object of the present invention is to provide a pneumatic tire capable of improving wet performance without sacrificing steering stability.

DISCLOSURE OF THE INVENTION

The invention in a first aspect is a pneumatic tire in which at least a pair of circumferential main grooves extending along a tire circumferential direction is formed on a tread, the tread is defined into at least a plurality of land portion rows comprising at least a central land portion row at the tire equatorial plane side and bilateral land portion rows disposed at tire axial direction outer sides of the central land portion row, and a plurality of lateral grooves extending along the tire axial direction is formed on the central land portion row and the bilateral land portion rows, in the tire circumferential direction, wherein the lateral grooves which are formed on at least the central land portion row are extended from land portion both edges to land portion inner sides by at least 15% or more of the central land portion row tire axial direction width, and the central land portion row is defined into blocks or false blocks, and the blocks or false blocks form chamfer portions, each having a depth gradually increasing toward the circumferential main groove and each facing the circumferential main groove, in the vicinities of the tire circumferential direction one side corner portions of the central land portion row, whereby the vicinities of both sides in a tire width direction of the central land portion row are made uneven in the tire circumferential direction.

Next, operation and effects of the pneumatic tire according to the first aspect will be explained.

According to the pneumatic tire of the first aspect, at least a pair of the circumferential main grooves is disposed along Further, since lateral grooves are formed on the central land portion row, and extended from land portion both edges to land portion inner sides by at least 15% or more of the tire axial direction width of the central land portion row, and the central land portion row is defined into blocks or false blocks, whereby wet performance is enhanced.

Moreover, if the length of each lateral groove is less than 15% of the tire axial direction width of the central land portion row, it does not suffice for wet performance. Therefore, it is preferred that lateral grooves are disposed to be spaced away from each other substantially at a constant distance in the tire circumferential direction in order to prevent deviation of draining performance on the tire circumference.

By the way, in order to increase steering stability, it is effective to enlarge the width of the central land portion row. However, due to the excessive increase of the central land portion row width, a problem is caused that wet draining performance is deteriorated.

Thus, if lots of lateral grooves (lug grooves) are used in the central land portion row in order to compensate wet draining performance, land portion rigidity of the central land portion row is deteriorated, resulting in a deterioration of steering stability.

In the pneumatic tire of the present invention, since chamfer portions, each having a depth gradually increasing toward each circumferential main groove, are formed in the vicinities of the tire circumferential direction one side corner portions of the blocks or false blocks of the central land portion row, facing the circumferential main grooves, water between the land portion tread surface and road surface is drained through the chamfer portions into the circumferential main grooves, and wet draining performance can be improved.

In this way, since the chamfer portions drain water, use of lots of lateral grooves becomes unnecessary, high level of land portion rigidity of the central land portion row as well as excellent steering stability can be obtained.

In addition, due to the provision of the chamfer portions at the central land portion row, the ground-contact area of the central land portion row is decreased, and high ground-contact pressure can be obtained on the ground-contact surface.

Accordingly, due to a change of an area of the chamfer portion, an optimum ground-contact pressure can be obtained.

It is effective to dispose the chamfer portions adjacent to the lateral grooves in order to increase draining performance. By disposing the chamfer portions adjacent to the lateral grooves, the chamfer portions are formed in the vicinities of the tire circumferential direction one side corner portions of blocks and false blocks.

Further, since the chamfer portions are formed, and the transverse direction both side vicinities of the central land portion row are made uneven in the tire circumferential direction, wet draining performance can be enhanced without deviation on the tire circumference.

Since the pneumatic tire according to claim 1 is structured as described above, the present invention has an excellent effect that wet performance can be improved without sacrificing steering stability.

The invention in a second aspect is the pneumatic tire wherein the central land portion row chamfer portion is formed in the vicinity of an obtuse angled corner portion of the block or the false block as seen from a tread plan view of the block or the false block, is formed into a substantially trapezoid shaped tread plan view configuration whose upside faces the circumferential main groove side and whose base is substantially parallel to the tire circumferential direction, and has a planar shape which is inclined at a constant angle with respect to a tread surface.

Next, operation and effects of the pneumatic tire according to the second aspect will be explained.

The chamfer portion is formed into a substantially trapezoid shape, the upside of the trapezoid shape is disposed at the circumferential main groove side, and the area of the chamfer portion becomes smaller at the circumferential main groove side.

Since the ground-contact area of a portion of the central land portion row adjacent to the circumferential main groove increases as compared to a case in which the base of the trapezoid shape is disposed at the circumferential main groove side, unevenness of the ground-contact portion of the central land portion row as a whole can be lessened.

Further, since the base of the trapezoid of the chamfer portion is made substantially parallel to the tire circumferential direction, occurrence of uneven wear can be suppressed (obtaining of resistance to uneven wear).

Moreover, in the present embodiment, "being substantially parallel to a tire circumferential direction" includes an inclining angle of less than 10° with respect to the tire circumferential direction.

Since the pneumatic tire according to the second aspect is structured as described above, the present invention has an excellent effect that unevenness of the road-contact portion of the central land portion row as a whole becomes smaller, whereby occurrence of unevenness can be suppressed.

The invention in a third aspect is the pneumatic tire wherein the tire axial direction one side lateral groove of the central land portion row and the tire axial direction other side lateral groove thereof are connected to each other by the first narrow groove whose width is smaller than those of the lateral grooves.

Next, operation and effects of the pneumatic tire according to the third aspect will be explained.

The tire axial direction one side lateral groove of the central land portion row and the tire axial direction other side lateral groove thereof are connected to each other by the first narrow groove whose width is smaller than those of the lateral grooves, thus making it possible to make land portion rigidity of the central land portion row even on the tire circumference.

Here, it is preferable that the groove width of the first narrow groove is 2 mm or less.

Since the pneumatic tire according to the third aspect is structured as described above, the present invention has an excellent effect that land portion rigidity of the central land portion row can be made even on the tire circumference.

The invention in a fourth aspect is the pneumatic tire wherein the tire axial direction width of the central land portion row chamfer portion is set within a range of from 5 to 30% of that of the central land portion row, and the depth of the tire circumferential main groove side lower edge of the central land portion row chamfer portion is set within a range of from 5 to 50% of that of the tire circumferential main groove adjacent to the central land portion row chamfer portion.

Next, operation and effects of the pneumatic tire according to the fourth aspect will be explained.

When the tire axial direction width of the central land portion row chamfer portion is less than 5% of that of the central land portion row, grooved portions (i.e., the area of portions which do not contact the ground due to chamfering) become insufficient thus deteriorating wet draining performance.

On the other hand, when the tire axial direction width of the central land portion row chamfer portion exceeds 30% of that of the central land portion row, the ground-contact area becomes too lessened thus deteriorating steering stability.

Accordingly, it is preferable that the tire axial direction width of the central land portion row chamfer portion is set within a range of from 5 to 30% of that of the central land portion row.

Next, when the depth of the circumferential main groove side lower edge of the central land portion row chamfer portion is less than 5% of the depth of the circumferential main groove adjacent to the central land portion row chamfer portion, the volume of the grooved portions as a whole becomes insufficient thus deteriorating wet draining performance.

On the other hand, when the depth of the circumferential main groove side lower edge of the central land portion row chamfer portion exceeds 50% of the depth of the circumferential main groove adjacent to the central land portion row chamfer portion, chamfer portion rigidity is deteriorated thus deteriorating steering stability.

Accordingly, it is preferable that the depth of the tire circumferential main groove side lower edge of the central land portion row chamfer portion is set within a range of from 5 to 50% of that of the tire circumferential main groove adjacent to the central land portion row chamfer portion.

Since the pneumatic tire according to claim 4 is structured as described above, the present invention has an excellent effect that wet draining performance and steering stability can keep the balance therebetween.

The invention in a fifth aspect is the pneumatic tire wherein a sidewall surface of the central land portion row non-chamfer portion at the central land portion row chamfer portion side is formed at the angle of substantially 90° with respect to the tread surface at a boundary portion between the central land portion row chamfer portion and the central land portion row non-chamfer portion not-including the central land portion row chamfer portion.

Next, operation and effects of the pneumatic tire according to fifth aspect will be explained.

In the fifth aspect, substantially 90° stands for 90°±10 °.

When the sidewall surface of the central land portion row non-chamfer portion at the central land portion row chamfer portion side forms an extremely acute angle (less than 80°) with respect to the tread surface, land portion rigidity of the boundary portion becomes insufficient, and uneven wear easily occurs.

On the other hand, when the sidewall surface of the central land portion row non-chamfer portion at the central land portion row chamfer portion side forms an extremely obtuse angle (more than 100°) with respect to the tread surface, edge effects become fragile, and tire performance on a snowy road is deteriorated.

Accordingly, it is preferable that the central land portion row non-chamfer portion at the central land portion row chamfer portion side is formed at the angle of substantially 90° with respect to the tread surface.

Since the pneumatic tire according to the fifth aspect is structured as described above, the present invention has an excellent effect that uneven wear and tire performance on a snowy road can keep the balance therebetween.

The invention in a sixth aspect is the pneumatic tire wherein at least a portion of the tire axial direction one side chamfer portion and at least a portion of the tire axial direction other side chamfer portion are disposed so as to face each other.

Next, operation and effects of the pneumatic tire according to the sixth aspect will be explained.

Since at least a portion of the tire axial direction one side chamfer portion and at least a portion of the tire axial direction other side chamfer portion are disposed so as to face each other, wet draining performance and land portion rigidity can be uniform at both sides of the central land portion row.

Since the pneumatic tire of the sixth aspect is structured as described above, the present invention has an excellent effect that wet draining performance and land portion rigidity can be uniformed at the left-hand side and the right-hand side of the central land portion row.

The invention in a seventh aspect is the pneumatic tire wherein the central land portion row chamfer portion is protruded closer to the circumferential main groove side adjacent to the central land portion row chamfer portion than the central land portion row non-chamfer portion not including the central land portion row chamfer portion adjacent to the central land portion row chamfer portion in the tire circumferential direction, and a tire axial direction protruding amount of the central land portion row chamfer portion in reference to the circumferential main groove side edge of the central land portion row non-chamfer portion is set within a range of from 2.5 to 40% of a width of the circumferential main groove adjacent to the central land portion row chamfer portion.

Next, operation and effects of the pneumatic tire according to the seventh aspect will be explained.

When a land portion is chamfered, ordinarily, land portion rigidity is deteriorated. However, in the central land portion row, the land portion on which a chamfer portion is formed is protruded closer to the circumferential main groove side adjacent to the chamfer portion than the non-chamfer portion, whereby deterioration of land portion rigidity can be offset.

Here, when the tire axial direction-protruding amount of the chamfer portion is less than 2.5% of the circumferential main groove width adjacent to the chamfer portion, effects due to protrusion of the chamfer portion are rarely exhibited.

On the other hand, when the tire axial direction-protruding amount of the chamfer portion exceeds 40% of the circumferential main groove width adjacent to the chamfer portion, wet draining performance of the circumferential main grooves is deteriorated.

Accordingly, it is preferable that the tire axial-direction protruding amount of the chamfer portion is set within a range of from 2.5 to 40% of the width of the circumferential main groove adjacent to the chamfer portion.

Since the pneumatic tire according to the seventh aspect is structured as described above, deterioration of land portion rigidity due to forming chamfer portions can be offset without deteriorating wet draining performance.

The invention in an eighth aspect is the pneumatic tire wherein the central land portion row chamfer portion is formed only at a portion protruding closer to the circumferential main groove side than the central land portion row non-chamfer portion adjacent to the central land portion row chamfer portion in the tire circumferential direction.

Next, operation and effects of the pneumatic tire according to the eighth aspect will be explained.

In the pneumatic tire according to the eighth aspect, since the central land portion row chamfer portion is formed only at a portion protruding closer to the circumferential main groove side, steps in the tire circumferential direction of the central land portion row can be reduced thus making it possible to enhance wear resistance and resistance to uneven wear of the central land portion row.

Since the pneumatic tire according to the eighth aspect is structured as described above, excellent effects can be provided in that wear resistance and resistance to uneven wear of the central land portion row can be enhanced.

The invention in a ninth aspect is the pneumatic tire wherein the tire axial direction groove wall of a portion of the central land portion row protruding to the circumferential main groove side and the tire axial direction groove wall of the central land portion row non-chamfer portion are connected to a groove bottom portion of the circumferential main groove substantially at the same position in the tire axial direction.

Next, operation and effects of the pneumatic tire according to the ninth aspect will be explained.

In the pneumatic tire according to the ninth aspect, since the tire axial direction groove wall of a portion of the central land portion row protruding to the circumferential main groove side and the tire axial direction groove wall of the central land portion row non-chamfer portion are connected to a groove bottom portion of the circumferential main groove substantially at the same position in the tire axial direction, water in the circumferential main grooves can be flown smoothly.

Further, in the tire axial direction position as referred herein, "substantially the same position" stands for a position at which the tire axial direction position difference between the groove walls is 1.0 mm or less.

Moreover, since the inclination of the tire axial direction groove wall of the non-chamfer portion is gentle than that of the tire axial direction groove wall of a portion of the central land portion row protruding to the circumferential main groove, land portion rigidity of the central land portion row can be enhanced.

Since the pneumatic tire according to the ninth aspect is structured as described above, the present invention has an excellent effect that water inside the circumferential main grooves can be flown smoothly.

Further, since the pneumatic tire according to the ninth aspect is structured as described above, the present invention has excellent effects that land portion rigidity of the bilateral land portion rows is enhanced, and heel-and-toe wear thereof can be suppressed. The present invention also has excellent effects that pattern noise can be reduced and wet performance can be improved as compared to a ease where chamfer portions are not formed.

The invention in a tenth aspect is the pneumatic tire wherein the bilateral land portion row lateral groove comprises a narrow-width portion in which a portion of the tire equatorial plane side lateral groove is formed narrower and a large-width portion in which a remaining portion of the tread edge side lateral groove is formed wider, and a planar chamfer portion, whose tread plane view is formed into a substantially rectangular shaped configuration which is longer along the bilateral land portion row lateral groove, is formed in a region where the narrow-width portion is formed, and inclined at a constant angle, starting from an imaginary extension line of a tread surface side edge of the large-width portion toward the circumferential main groove side adjacent to the bilateral land portion row chamfer portion.

Next, operation and effects of the pneumatic tire according to the tenth aspect will be explained.

Since the width of the bilateral land portion row lateral groove at the tire equatorial plane side is formed narrower, land portion rigidity of the bilateral land portion row is enhanced, and block edge motions at both sides of the narrow-width portion are reduced, whereby heel-and-toe wear can be suppressed.

Further, air volume inside the lateral groove having the narrow-width portion is decreased, and accordingly, pattern noise is decreased.

Moreover, since a planar chamfer portion, whose tread plane view is formed into a substantially rectangular shaped configuration which is longer along the bilateral land portion row lateral groove, is formed in the narrow-width portion of the bilateral land portion row lateral groove, and inclined at a constant angle, starting from an imaginary extension line of a tread surface side edge of the large-width portion toward the circumferential main groove side adjacent to the bilateral land portion row chamfer portion, the area of the groove is extended, and wet performance is enhanced as compared to a case in which blocks are not chamfered.

Since the pneumatic tire according to the tenth aspect is structured as described above, the present invention has excellent effects that even performance can be kept at both sides of the tread, and high level of wet draining performance can be obtained. Further, the present invention has excellent effects that land portion rigidity of the second land portion rows is enhanced and heel-and-toe wear thereof can also be suppressed. The present invention also has excellent effects that pattern noise can be reduced, and wet performance is enhanced as compared to a case in which blocks are not chamfered. Further, since the direction of the bilateral land portion row chamfer portions and the direction of the second land portion row chamfer portions are opposed to each other with respect to the tire circumferential direction, deviation of noise and resistance to uneven wear due to a rotational direction of the tire can be prevented.

The invention according to an eleventh aspect is the pneumatic tire wherein the central land portion row is disposed on the tire equatorial plane, the second land portion row, which is defined by each of the circumferential main grooves, is disposed between the central land portion row and each of the bilateral land portion rows, the second land portion row lateral groove comprises a narrow-width portion in which a portion of the tire equatorial plane side lateral groove is formed narrower and a large-width portion in which a remaining portion of the tread edge side lateral groove is formed wider, and a planar chamfer portion, whose tread plane view is formed into a substantially rectangular shaped configuration which is longer along the second land portion row lateral groove, is formed in a region where the narrow-width portion of the second land portion row lateral groove is formed, and inclined at a constant angle, starting from an imaginary extension line of a tread surface side edge of the large-width portion toward the circumferential main groove side adjacent to the second land portion row chamfer portion, and the direction of the second land portion row chamfer portions and that of the bilateral land portion row chamfer portions are opposed to each other with respect to the tire circumferential direction.

Next, operation and effects of the pneumatic tire according to the eleventh aspect will be explained.

Since the central land portion row is disposed on the tire equatorial plane, a uniform arrangement of land portions is enabled at both sides of the central land portion row, and uniform performance can be provided at both sides thereof.

Since the second land portion row which is defined by each of the circumferential main grooves is disposed between the central land portion row and each of the bilateral land portion rows, the tread is formed in a pattern of four main grooves, and wet draining performance can be obtained at high level.

In the second land portion row, since a portion of the tire equatorial plane side lateral groove is formed narrower than the remaining portion thereof, land portion rigidity of the second land portion row can be enhanced, and block edge motions at both sides of the narrow-width portion can be lessened, and heel-and-toe wear can be suppressed.

Further, air volume inside the lateral groove having the narrow-width portion is decreased, whereby pattern noise is decreased.

Moreover, since a planar chamfer portion, whose tread plane view is formed into a substantially rectangular shaped configuration which is longer along the second land portion row lateral groove, is formed in a region where the narrow-width portion of the second land portion row lateral groove is formed, and inclined at a constant angle, starting from an imaginary extension line of a tread surface side edge of the large-width portion toward the circumferential main groove side adjacent to the second land portion row chamfer portion, the area of grooves is increased, and wet performance is further enhanced as compared to a case in which blocks are not chamfered.

Here, when the bilateral land portion row planar chamfer portions and the second land portion row planar chamfer portions are directed in the same direction with respect to the tire circumferential direction, leading edges and trailing edges are focused on either the chamfered block sides or the non-chamfered block sides, and noise and resistance to uneven wear are deviated due to a rotational direction of the tire.

In the present invention, since the direction of the bilateral land portion row planar chamfer portions and that of the second land portion row planar chamfer portions are opposed to each other with respect to the tire circumferential direction, noise and resistance to uneven wear are not deviated due to the tire rotational direction.

Since the pneumatic tire according to the eleventh aspect is structured as described above, the present invention has excellent effects that draining performance through chamfer portions can be obtained, while preventing occurrence of heel-and-toe wear or deterioration of pattern noise.

The invention according to a twelfth aspect is the pneumatic tire wherein a lower edge position of the bilateral land portion row chamfer portion is set within a range of from 5 to 30% of a depth of the circumferential main groove adjacent to the bilateral land portion row chamfer portion, and a tire axial direction width of the bilateral land portion row chamfer portion is set within a range of from 15 to 60% of that of the bilateral land portion row width.

Next, operation and effects of the pneumatic tire according to the twelfth aspect will be explained.

When the lower edge position of the bilateral land portion row chamfer portion is less than 5% of the depth of the circumferential main groove adjacent to the bilateral land portion row chamfer portion, effects due to chamfering are rarely exhibited.

On the other hand, when the lower edge position of the bilateral land portion row chamfer portion exceeds 30% of the depth of the circumferential main groove adjacent to the bilateral land portion row chamfer portion, air volume inside the chamfer portion is increased thereby allowing the bilateral land portion row chamfer portion to function in the same manner as a large-width groove, resulting in occurrence of heel-and-toe wear or deterioration of pattern noise.

Accordingly, it is preferable that the lower edge position of the bilateral land portion row chamfer portion is set within a range of from 5 to 30% of the depth of the circumferential main groove adjacent to the bilateral land portion row chamfer portion.

Next, when the tire axial direction width of the bilateral land portion row chamfer portion is less than 15% of that of the bilateral land portion row, the area of a portion which is not narrowed increases, whereby heel-and-toe wear easily occurs on the portion.

On the other hand, when the tire axial direction width of the bilateral land portion row chamfer portion exceeds 60% of that of the bilateral land portion row, air volume inside the bilateral land portion row lateral grooves as a whole becomes insufficient thus deteriorating wet draining performance.

Accordingly, it is preferable that the tire axial direction width of the bilateral land portion row chamfer portion is set within a range of from 15 to 60% of that of the bilateral land portion row width.

Since the pneumatic tire according to the twelfth aspect is structured as described above, the present invention has an effect that land portion rigidity of blocks or false blocks can be uniformed.

The invention according to a thirteenth aspect is the pneumatic tire wherein the block or the false block of the bilateral land portion row is defined into a plurality of sub-blocks by a second narrow groove whose width is smaller than the lateral groove.

Next, operation and effects of the pneumatic tire according to the thirteenth aspect will be explained.

The block or the false block of the bilateral land portion row is defined into a plurality of sub-blocks by a second narrow groove whose width is smaller than the lateral groove, whereby land portion rigidity of the block or the false block can be controlled and land portion rigidity, for example, can be uniformed.

Here, it is preferable that the groove width of the second narrow groove is 2 mm or less.

Since the pneumatic tire according to the thirteenth aspect is structured as described above, during a road contacting of the tire, apparent land portion rigidity is increased, and the collapse of blocks or false blocks can be prevented.

The invention in a fourteenth aspect is the pneumatic tire wherein the second narrow groove has at least two bent portions at the depth direction intermediate portions.

Next, operation and effects of the pneumatic tire according to the fourteenth aspect will be explained.

As the tire is rotated, and blocks or false blocks are contacted with a road surface, upon a receipt of a compressive force in a tire radial direction, groove walls facing each other of the bent portions are kept in tight contact with each other, and sub-blocks are supported by each other, whereby apparent land portion rigidity is enhanced, and the collapse of blocks or false blocks can be prevented.

Since the pneumatic tire according to the fourteenth aspect is structured as described above, the present invention has effects that the direction of an edge effect of the second narrow groove does not change from the beginning as a new tire product to the end as a worn tire, whereby a steady edge effect can be obtained.

The invention in a fifteenth aspect is the pneumatic tire wherein the lengthwise direction of the second narrow groove does not change due to a depth size.

Next, operation and effects of the pneumatic tire according to the fifteenth aspect will be explained.

In accordance with the pneumatic tire of the fifteenth aspect since the lengthwise direction of the second narrow groove which appears on the tread surface does not change as the tire is getting worn, orientation of the edge effect of the second narrow groove does not change from the beginning as a new tire product to the end as a worn tire.

BRIEF DESCRIPTION OF THE DRAWINGS

FIG. 1 is a plan view of a tread of a pneumatic tire according to an embodiment of the present invention.

FIG. 10 is a plan view of a tread of a pneumatic tire according to a conventional example.

BEST MODES FOR CARRYING OUT THE INVENTION

First Embodiment

Hereinafter, with reference to the drawings, the first embodiment of the present invention will be described in detail.

As shown in FIG. 1, a tread 12 of a pneumatic tire 10 of the present embodiment comprises a pair of central circumferential main grooves 14 each of which is formed at both sides of the tire equatorial plane CL so as to extend along a tire circumferential direction (the direction of arrow A (tire rotating direction in the present embodiment), and the direction of arrow B), and a pair of side circumferential main grooves 16 each of which is formed at tire axial direction outer sides of the central circumferential main grooves 14 so as to extend along a tire circumferential direction.

Further, since the pneumatic tire 10 of the present embodiment is structured in the same manner as in radial tires in general use, a description of the inner structure thereof will be omitted.

(Central Land Portion Row)

A central land portion row 18, which is defined by a pair of the central circumferential main grooves 14, is disposed on the tire equatorial plane CL of the tread 12.

Figure 2A:
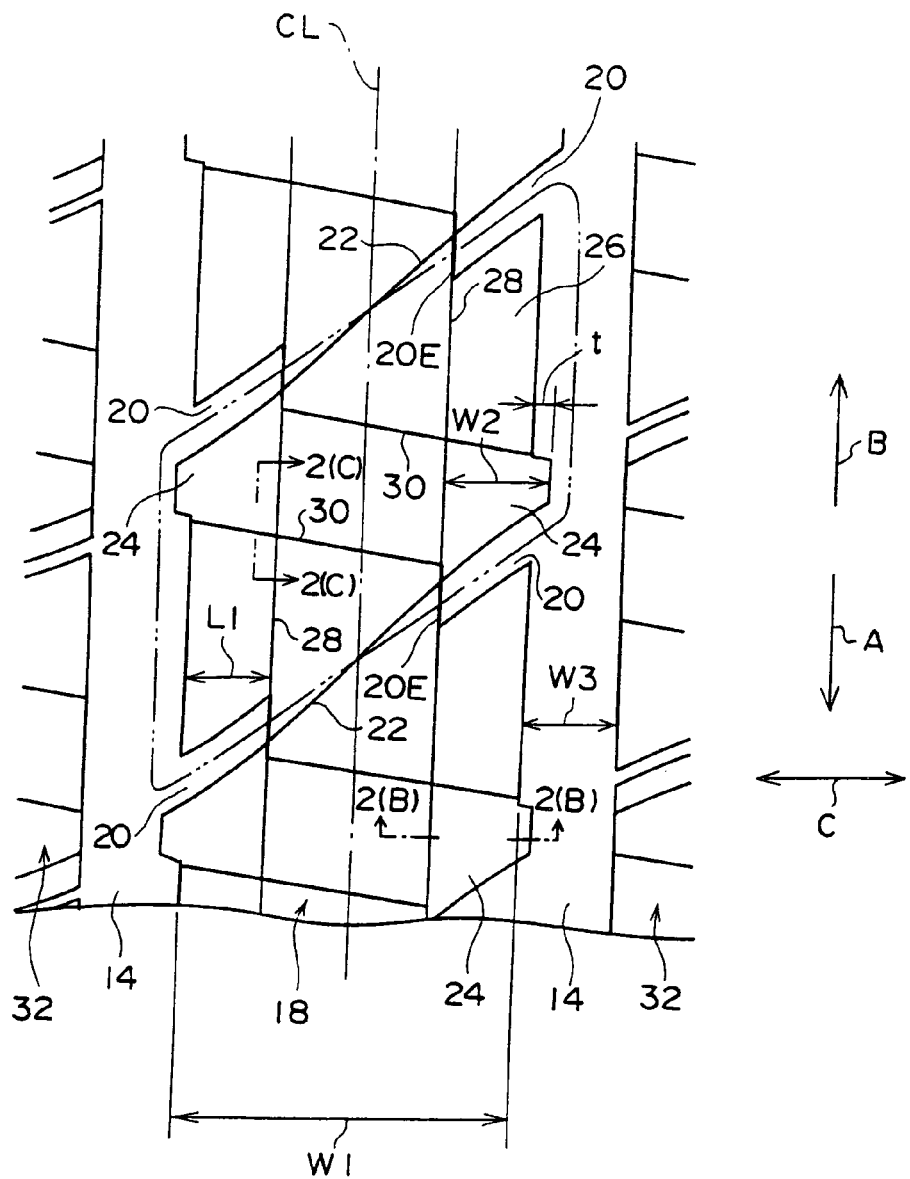
FIG. 2(A) is an enlarged plan view of a central land portion row.

As shown in FIG. 2(A), shorter central land portion row lateral grooves 20, each extending inwardly of the land portion from the respective central circumferential main grooves 14, and each terminating inside the land portion, are formed in the vicinities of both edge of the central land portion row 18.

In the present embodiment, the central land portion row lateral grooves 20 at the left-hand side of this figure are inclined with the right-hand sides up and are terminated on this side of the tire equatorial plane CL, and similarly, those at a right-hand side of this figure are inclined with the right sides up and are terminated on this side of the tire equatorial plane CL.

The central land portion row lateral grooves 20 at the left-hand side of this figure and those at the right-hand side of this figure are positioned substantially on their extension lines, and are connected to each other by inclining sipes 22 extending along the extension lines.

A plurality of the central land portion row lateral grooves 20 is arranged at both sides of the central land portion row 18 of the present embodiment, and the central land portion row 18 is defined into false blocks. Further, a "false block" referred herein is different from a block whose entire periphery is surrounded by open-grooves which do not close during ground contacting of a tire, and refers to a substantially block-shaped block in which a portion of a land portion (30% or less of a circumferential length of a block) is kept in continuous contact with another land portion or a substantially block-shaped block in which a portion of a land portion abuts another land portion through a sipe or a narrow groove which partially closes during ground contacting of a tire, and FIG. 2(A) shows a land portion surrounded by a double-chain dot line as a false block.

Figure 6:
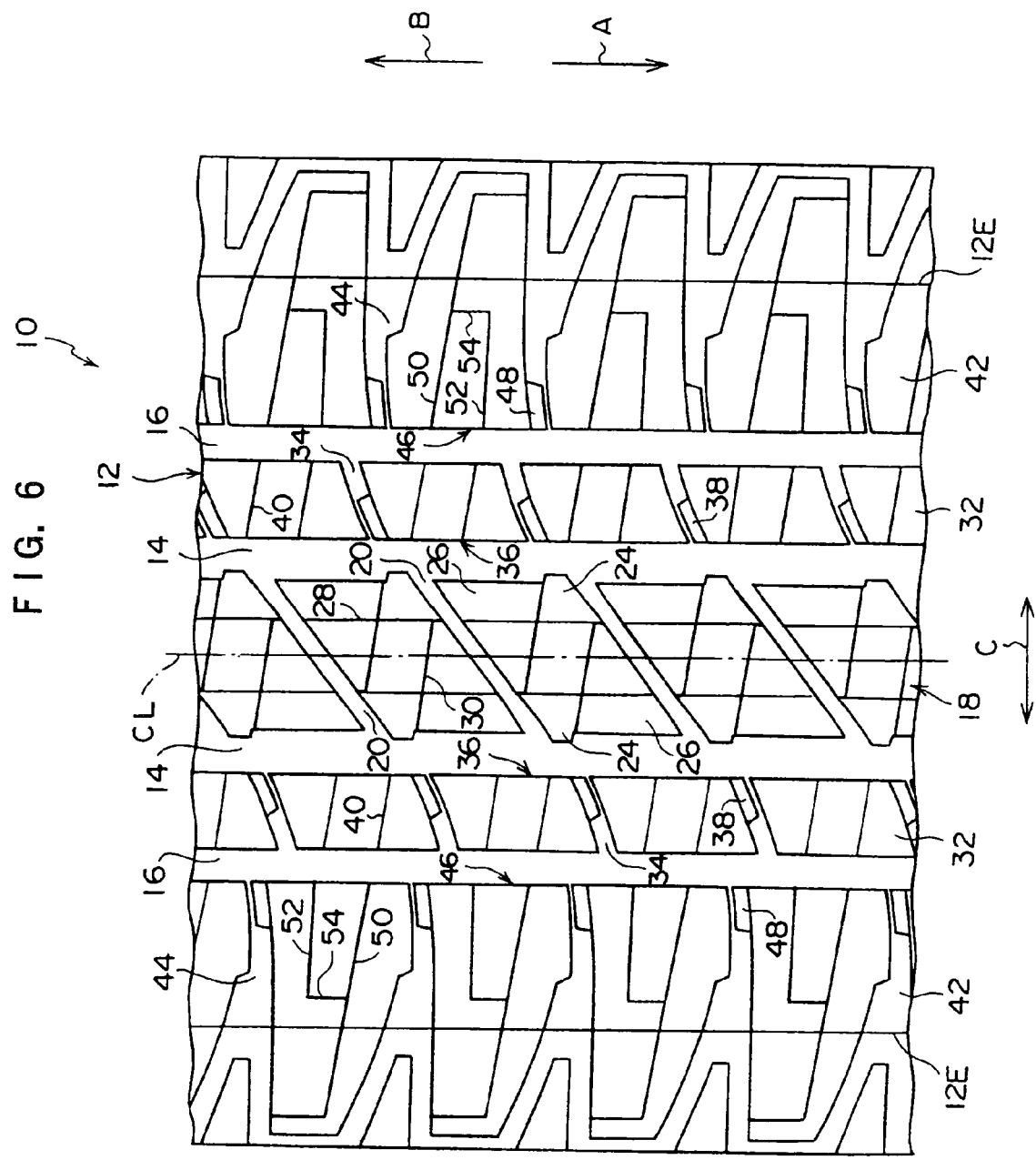
FIG. 6 is a plan view of a tread of a pneumatic tire according to another embodiment of the present invention.

In addition, a tire axial direction length L1 of the central land portion row lateral groove 20 of the present embodiment is 27% of a tire axial direction width W1 of the central land portion row 18. However, at least 15% of the tire axial direction width W1 suffices for the tire axial direction length L1, or as shown in FIG. 6, the central land portion row lateral groove 20 can cross the central land portion row 18 (100% of the tire axial direction width W1 of the central land portion row 18).

As shown in FIG. 2(A), central land portion row chamfer portions 24 are formed in the vicinities of obtuse angle portions of the central land portion row 18 such that the obtuse angle of the obtuse angle portions is formed by the central land portion lateral groove 20 and the central circumferential main groove 14 connecting thereto and exceeds 90°.

Figure 2B:
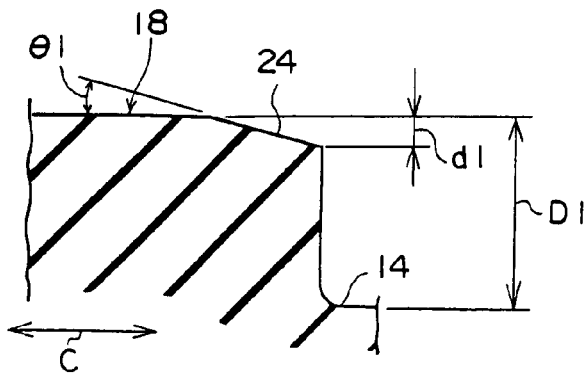
FIG. 2(B) is a cross-sectional view of the central land portion row of FIG. 2(A) taken along line 2(B)-2(B).

As shown in FIG. 2(B), in the present embodiment, the central land portion row chamfer portion 24 is inclined at a constant angle of θ1 in a tire axial direction, and toward the central circumferential main groove 14 adjacent thereto, and as shown in FIG. 1, the tread plan view of the central land portion row chamfer portion 24 is formed into a trapezoid-shaped configuration whose upside faces the central circumferential main groove 14 side.

Moreover, a depth gradually increasing substantially in the tire axial direction and toward the central circumferential main groove 14 adjacent thereto suffices for the depth of the central land portion chamfer portion 24, and the direction of the central land portion chamfer portion 24 can be slightly inclined (less than 10°) with respect to the tire axial direction.

The central land portion row chamfer portion 24 can be formed into other tread plan view configurations than a trapezoid-shaped configuration.

Here, it is necessary to form the central land portion row chamfer portion 24 within the tire axial direction width of the central land portion row lateral groove 20. As shown in FIG. 2(A), it is preferable that a tire axial direction width W2 is set within a range of from 5 to 30% of the tire axial direction width W 1 of the central land portion row 18.

A chamfer starting position (the base of the trapezoid shape) of the central land portion row chamfer portion 24 of the present embodiment corresponds to a tire axial direction position of a terminal edge 20E of the central land portion row lateral groove 20, and the tire axial direction width W2 is set to 30% of the tire axial direction width W1 of the central land portion row 18.

Further, in the present embodiment, although the chamfer starting position (the base side of the trapezoid shape) of the central land portion row chamfer portion 24 is parallel to the tire circumferential direction, the chamfer starting position can be inclined slightly (less than 10°) with respect to the tire circumferential direction.

As shown in FIG. 2(B), it is preferable that the depth d1 of the lower edge (the upside of the trapezoid shape) of the central land portion row chamfer portion 24 at the central circumferential main groove 14 side is set within a range of from 5 to 50% of the depth D1 of the central circumferential main groove 14 adjacent to the central land portion row chamfer portion 24.

In the present embodiment, the depth d1 of the lower edge of the central land portion row chamfer portion 24 at the central circumferential main groove 14 side is set to 30% of the depth D1 of the central circumferential main groove 14 adjacent to the central land portion row chamfer portion 24.

Figure 2C:
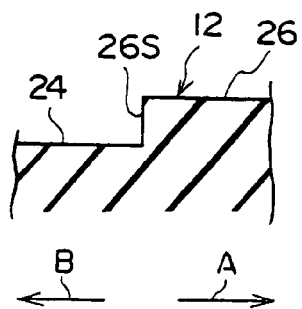
FIG. 2(C) is a cross-sectional view of the central land portion row of FIG. 2(A) taken along line 2(C)-2(C).

When a portion not including the central land portion row chamfer portion 24 of the land portion is referred to as a central land portion row non-chamfer portion 26, as shown in FIG. 2(C), in the present embodiment, a sidewall surface 26S of the central land portion row non-chamfer portion 26 at the central land portion chamfer portion 24 side is set at 90° with respect to a tread surface.

Figure 3:
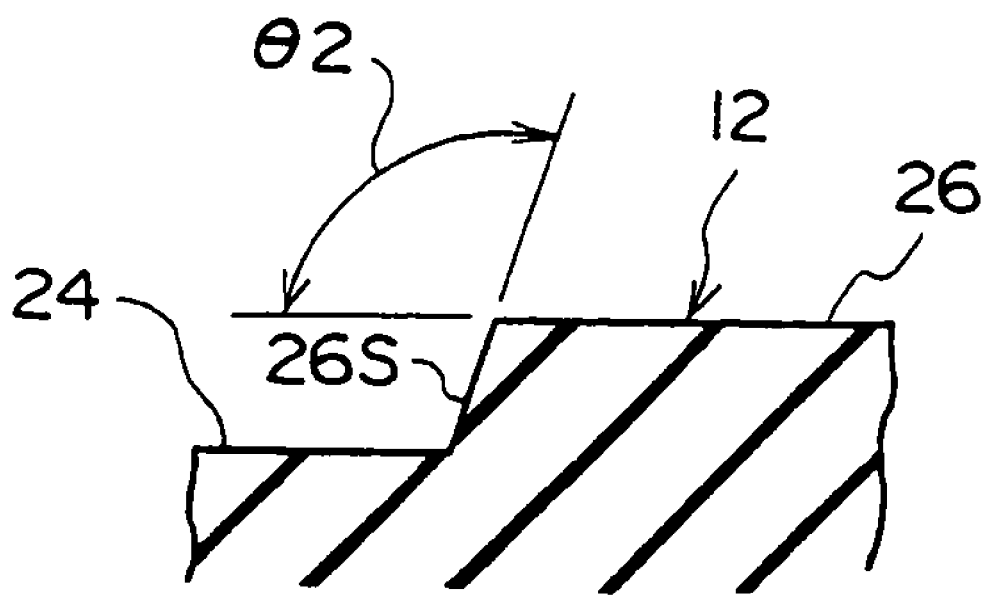
FIG. 3 is a cross-sectional view of a central land portion row according to another embodiment of the present invention.

Moreover, in the present embodiment, although the angle of the sidewall surface 26S with respect to a tread surface is set at 90°, as shown in FIG. 3, an angle θ2 with respect to the tread surface of the sidewall surface 26S can be 90°±10°.

In the central land portion row 18 of the present embodiment, as shown in FIG. 2(A), the left-hand side central land portion row chamfer portion 24 and the right-hand side central land portion row chamfer portion 24 are disposed to face each other at the respective chamfer starting positions (the bases of the trapezoid shapes).

A portion of the central land portion row chamfer portion 24 of the central land portion row 18 of the present embodiment is protruded closer to the circumferential main groove side adjacent to the central land portion row chamfer portion than the central land portion row non-chamfer portion.

It is preferable that a tire axial direction protruding amount t of the central land portion row chamfer portion 24 in reference to the central circumferential main groove 14 side edge of the central land portion row non-chamfer portion is set within a range of from 2.5 to 40% of the width W3 of the central circumferential main groove 14.

In the present embodiment, the tire axial direction protruding amount t of the central land portion row chamfer portion 24 is set to 20% of the groove width W3 of the central circumferential main groove 14.

Further, a circumferential sipe 28 extending from the terminal edge 20E of the central land portion row lateral groove 20 to the central land portion row chamfer portion 24, and a gentle inclining sipe 30 extending over the tire equatorial plane CL and connecting to the terminal edge of the circumferential direction sipe 28 on the other side are formed on the central land portion row.

(Second Land Portion Rows)

Second land portion rows 32, which are defined by the central circumferential main grooves 14 and the side circumferential main grooves 16, are disposed at the tire axial direction outer sides of the central land portion row 18.

Figure 4A:
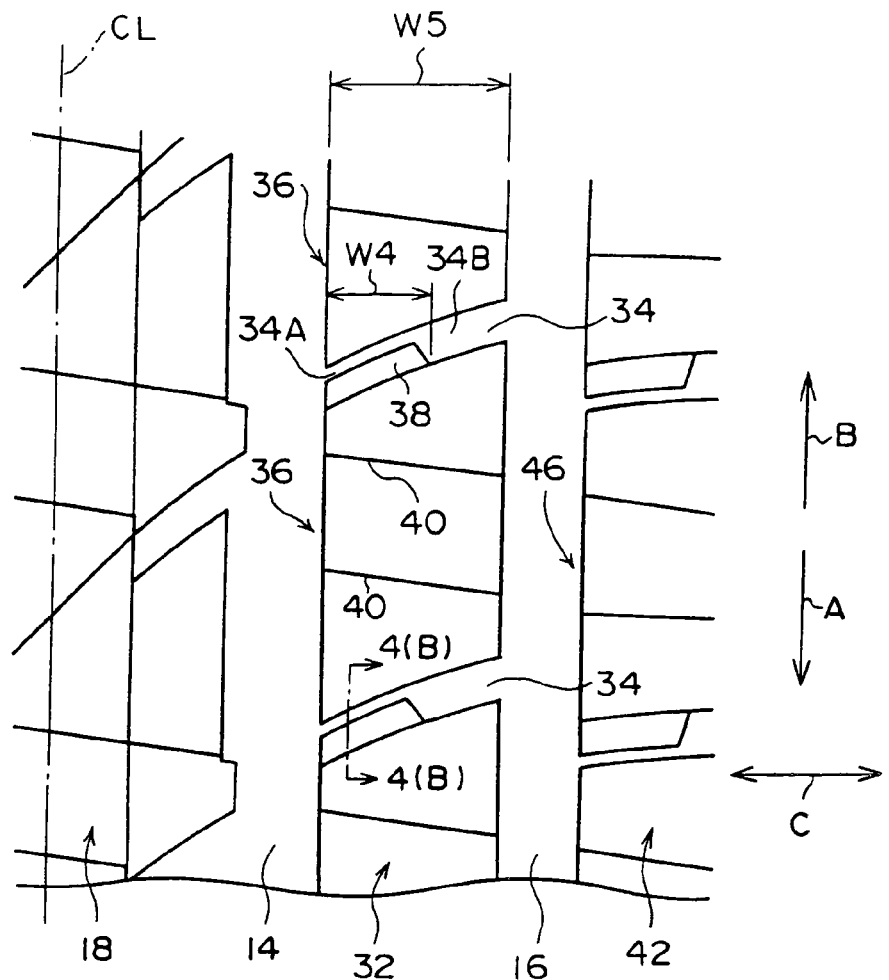
FIG. 4(A) is an enlarged plan view of a second land portion row.

As shown in FIG. 4(A), a plurality of second land portion row lateral grooves 34 crossing in the tire axial direction is formed on the second land portion rows 32, whereby the second land portion rows 32 are defined into a plurality of second blocks 36.

A tire equatorial plane CL side portion of each second land portion row lateral groove 34 is formed narrower than a tire axial direction outer side portion thereof.

Hereinafter, the second land portion row lateral groove 34 of the present embodiment comprises a portion referred to as a second land portion row narrow-width portion 34A which is formed narrower and the remaining portion referred to as a second land portion row large-width portion 34B which is formed wider.

In the present embodiment, a tire circumferential direction side portion of the second block 36 is protruded in order to form the second land portion row narrow-width portion 34A.

Second land portion row chamfer portions 38, each of which is formed in a region where the second land portion row narrow-width portion 34A is formed (a portion protruding from the second block 36), and inclined at a constant angle, starting from an imaginary extension line of the tread surface side edge of the second land portion row large-width portion 34B to the second land portion row narrow-width portion 34A, are formed on the second land portion rows 32 of the present embodiment.

The second land portion row chamfer portion 38 is formed into a substantially rectangular shaped tread plan view configuration which is longer along the second land portion row lateral groove 34.

Figure 4B:
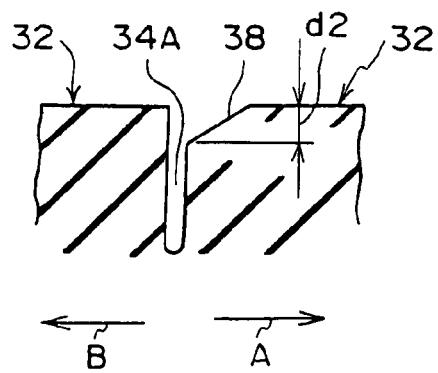
FIG. 4(B) is a cross-sectional view of the second land portion row of FIG. 4(A) taken along line 4(B)-4(B).

As shown in FIG. 4(B), it is preferable that the depth d2 of the lower edge of the second land portion row chamfer portion 38 is within a range of from 5 to 30% of the depth D1 of the central circumferential main groove 14 (see FIG. 2(B)) adjacent to the second land portion row chamfer portion 38, and in the present embodiment, the depth d2 is set to 10% of the depth D1 of the central circumferential main groove 14.

As shown in FIG. 4(A), it is preferable that the tire axial direction width W4 of the second land portion row chamfer portion 38 is within a range of from 15 to 60% of the tire axial direction width W5 of the second block 36, and in the present invention, the tire axial direction width W4 is set to 52% of the tire axial direction width W5 of the second block 36.

Further, two transverse sipes 40 are formed in the second block 36 so as to cross the second block 36 in the tire axial direction.

(Bilateral Land Portion Rows)

Figure 5A:
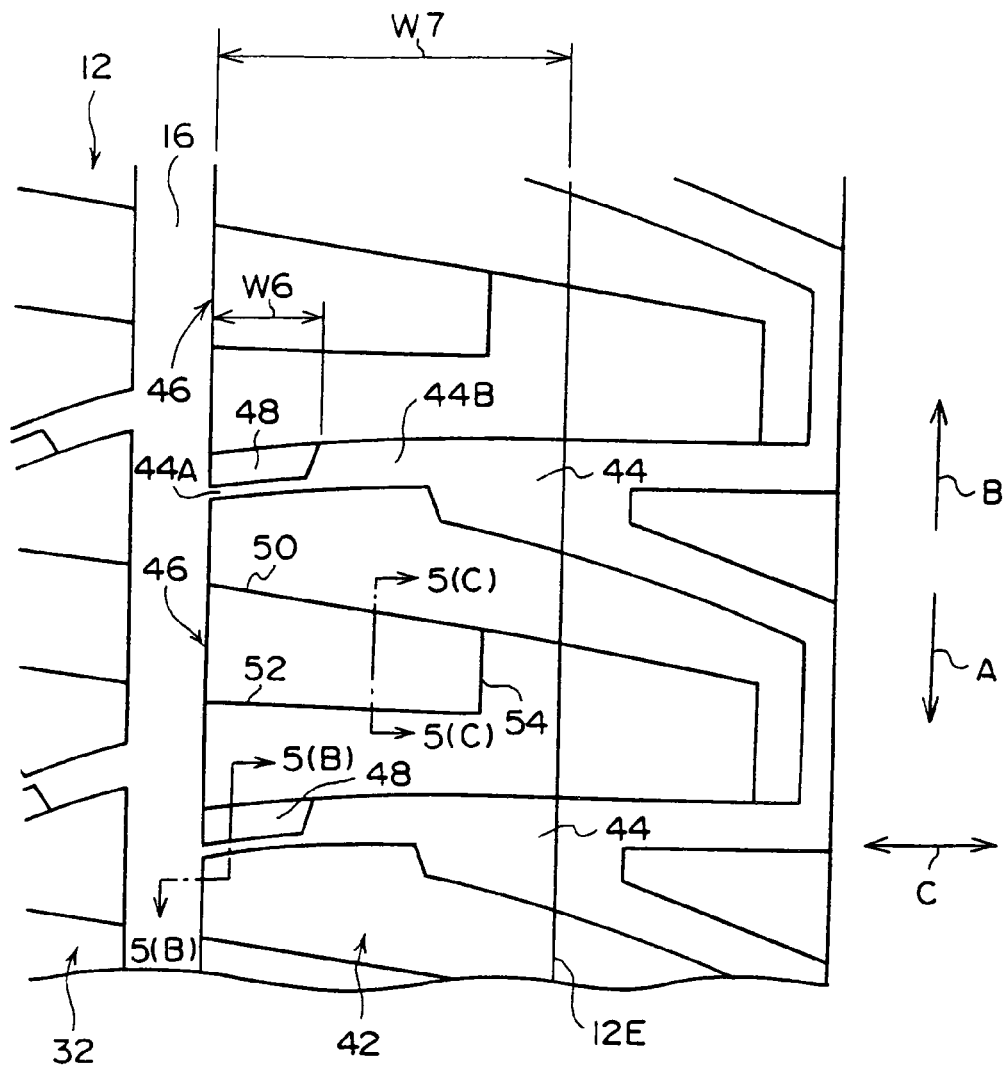
FIG. 5(A) is an enlarged plan view of a bilateral land portion row.

As shown in FIGS. 1 and 5, bilateral land portion rows 42 are disposed at the tire axial direction outer sides of the second land portion rows 32.

A plurality of bilateral land portion row lateral grooves 44 crossing in the tire axial direction is formed in the bilateral land portion row 42, and the bilateral land portion row 42 is defined into a plurality of shoulder blocks 46.

The width of a portion of the bilateral land portion 42 at the tire equatorial plane CL side is smaller than that of the remaining portion at the tire axial direction outer side thereof.

As shown in FIG. 5, the bilateral land portion row lateral groove 44 of the present embodiment comprises a portion referred to as a "bilateral land portion row narrow-width portion 44A which is formed narrower, and the remaining portion referred to as a "bilateral land portion row large-width portion 44B" which is formed wider.

In the present embodiment, a portion of one side surface in a tire circumferential direction of the shoulder block 46 is protruded in order to form the bilateral land portion row narrow-width portion 44A.

Bilateral land portion row chamfer portions 48, each of which is formed in a region where the bilateral land portion row narrow-width portion 44A is formed (a portion protruded from the shoulder block 46), and inclined at a constant angle, starting from imaginary extension line of the tread surface side edge of the bilateral land portion row large-width portion 44B to the bilateral land portion row narrow-width portion 44A, are formed on the bilateral land portion rows 42 of the present embodiment.

The bilateral land portion row chamfer portion 48 is formed into a substantially rectangular-shaped tread plane view configuration that is longer along the bilateral land portion row lateral groove 44.

Figure 5B:
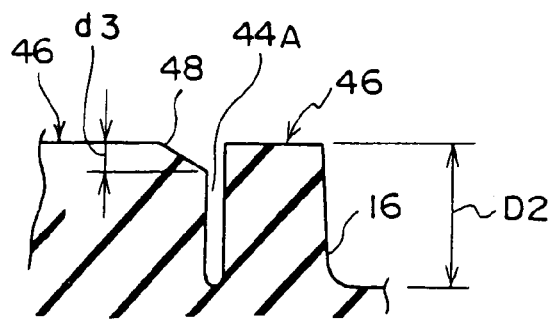
FIG. 5(B) is a cross-sectional view of the bilateral land portion row of FIG. 5(A) taken along line 5(B)-5(B).

As shown in FIG. 5(B), it is preferable that the depth d3 of the lower edge of the bilateral land portion row chamfer portion 48 is within a range of from 5 to 30% of the groove depth D2 of the side circumferential main groove 16, and in the present embodiment, d3 is set to 10% of the depth D2 of the side circumferential main groove 16.

Further, it is preferable that the tire axial direction width W6 of the bilateral land portion row chamfer portion 48 is 15 to 60% of the tire axial direction width W7 of the shoulder block 46, and in the present embodiment, W6 is set to 30% of the tire axial direction width W7 of the shoulder block 46.

Moreover, the tire axial direction width W7 of the shoulder block 46 referred herein is a size measured from the side circumferential main groove 16 side edge to the ground-contact edge 12E.

Further, a first axial direction sipe 50 which crosses the shoulder block 46 in the tire axial direction, a second axial direction 52 which is formed substantially parallel to the first axial direction sipe 50 and which is extended from the side circumferential main groove 16 toward the tread edge 12E, terminating near the shoulder block central portion, and a circumferential short sipe 54 which is extended from the terminal end of the second axial direction sipe 52 in the tire circumferential direction and is connected to the intermediate portion of the first axial direction sipe 50 at the shoulder block 46 are formed in the shoulder block 46.

Here, the tread edge 12E refers to the tire axial direction outermost end of the ground-contact portion of the pneumatic tire 10 when the pneumatic tire 10 is attached to a standard rim defined in "JATMA YEAR BOOK," (the Japan Automobile Tire Association standards—version 2002), filled with 100% internal pressure of air pressure (the maximum air pressure) corresponding to the maximum load capacity (i.e., bold typed loads of internal pressure-load capacity matching table) in the application size/ply rating in JATMA YEAR BOOK, and the maximum load capacity is applied thereto.

Figure 5C:
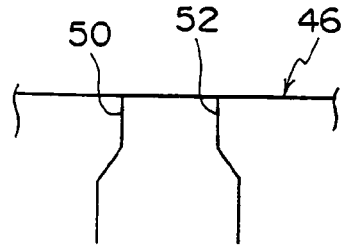
FIG. 5(C) is a cross-sectional view of the bilateral land portion row of FIG. 5(A) taken along line 5(C)-5(C).

As shown in FIG. 5(C), the first axial direction sipe 50 and the second axial direction sipe 52 are respectively bent at two points of the sipe depth direction intermediate portion as seen from a right cross section with respect to the sipe lengthwise direction.

The first axial direction sipe 50 and the second axial direction sipe 52 do not change their lengthwise directions due to the depths thereof.

(Operation)

In the pneumatic tire 10 of the present embodiment, since a pair of the central circumferential main grooves 14 and a pair of the side circumferential main grooves 16 are arranged on the tread 12 in the tire circumferential direction, the tread 12 is formed in a pattern of four main grooves, and a fundamentally high level of wet performance can be obtained.

Next, the central land portion row 18 will be explained.

The central land portion row 18 is disposed on the tire equatorial plane CL, and the second land portion rows 32 are disposed at outer sides of the central land portion row 18, and the bilateral land portions rows 42 are also disposed at furthest sides of the second land portion rows 32 to provide an uniform land portion arrangement at both sides of the tire equatorial plane CL. Accordingly, uniform performance can be exhibited at both sides of the tire equatorial plane CL.

A plurality of the central land portion row lateral grooves 20 is formed to be spaced away from each other substantially at a certain distance at both sides of the central land portion row 18, and the tire axial direction length L1 of the central land portion row lateral groove 20 is set to 30% of the tire axial direction width W1 of the central land portion row lateral groove 20. Accordingly, wet performance is further improved. Further, since the central land portion row lateral grooves 20 are provided so as to be spaced away from each other substantially at a certain distance, deviation of draining performance through the lateral grooves 20 on the tire circumference can be prevented.

Further, since the central land portion row chamfer portion 24 is formed at an obtuse angle portion of the central land portion row 18 adjacent to the central land portion lateral groove 20, the central land portion row chamfer portion 24 drains water between a tread surface and a road surface into the central circumferential main groove 14 adjacent thereto, whereby wet draining performance can be improved.

Thus, since the central land portion chamfer portion 24 drains water, use of lots of the central land portion row lateral grooves 20 becomes unnecessary, whereby land portion rigidity of the central land portion row 18 can be obtained, and steering stability can be obtained as well.

By providing the central land portion row chamfer portion 24 at the central land portion row 18, a ground-contact area of the central land portion row 18 is decreased, and a ground-contact pressure at high level can be obtained.

Accordingly, by changing the area of the central land portion row chamfer portion 24, an optimum ground-contact pressure can be obtained.

Further, since the central land portion row chamfer portion 24 is formed into a trapezoid shape and the upside of the trapezoid shape is disposed at the central circumferential main groove 14 side, the area of the central land portion row chamfer portion 24 is decreased at the central circumferential main groove 14 side. As compared to the case in which the base of the trapezoid shape is disposed at the central circumferential main groove 14 side, a portion of the central land portion row 18 adjacent to the central circumferential main groove 14 is increased, and degree of deviation of the ground-contact portion of the central land portion row 18 as a whole is decreased.

Furthermore, since the base of the trapezoid shape of the central land portion row chamfer portion 24 is made parallel to the tire circumferential direction, occurrence of uneven wear can be suppressed.

The inclining sipes 22 connecting the central land portion row lateral grooves 20 at the tire axial direction one side and the central land portion row lateral grooves 20 at the tire axial direction other side, the circumferential direction sipes 28 extending in the tire circumferential direction from the terminal ends 20E of the central land portion row lateral grooves 20, and similarly, the gentle inclining sipes 30 extending from the terminal ends 20E of the central land portion row lateral grooves 20 over the tire equatorial plane CL, and connecting the other side circumferential sipes 28 are formed on the central land portion row 18. Accordingly, land portion rigidity of the central land portion row 18 is uniformed at the tire circumference.

When the tire axial direction width W2 of the central land portion row chamfer portion 24 is less than 15% of the tire axial direction width W1 of the central land portion row 18, grooved portions (the total area of portions which do not contact the ground due to chamfering) become insufficient thus deteriorating wet draining performance.

On the other hand, when the tire axial direction width W2 of the central land portion row chamfer portion 24 exceeds 30% of the tire axial direction width W1 of the central land portion row 18, the ground-contact area of the central land portion row 18 becomes too small thus deteriorating wet draining performance.

Further, when the depth d1 of the lower edge of the central land portion row chamfer portion 24 is less than 5% of the depth D1 of the circumferential main groove 14, volumes of the groove portions become insufficient, and wet draining performance is deteriorated.

On the other hand, when the depth d1 of the lower edge of the central land portion row chamfer portion 24 exceeds 50% of the depth D1 of the circumferential main groove, land portion rigidity of the central land portion chamfer portion 24 is deteriorated thus deteriorating steering stability.

Further, since the sidewall surface 26S of the non-chamfer portion 26 is set at 90° with respect to the tread surface, high edge effect required for performance on a snowy road can be obtained, while suppressing occurrence of uneven wear.

Moreover, when the sidewall surface 26S and the tread surface form an extremely acute angle therebetween (θ2 is less than 80°), land portion rigidity of a boundary portion between the non-chamfer portion 26 and the central land portion chamfer portion 24 becomes insufficient, whereby uneven wear easily occurs.

On the other hand, the sidewall surface 26S and the tread surface form an extremely obtuse angle therebetween (θ2 exceeds 100°), edge effect is deteriorated thus deteriorating performance on a snowy road.

In the central land portion row 18 of the present embodiment, since the tire axial direction one side central land portion row chamfer portion 24 and the tire axial direction other side central land portion row chamfer portion 24 are disposed such that portions of the bases of the trapezoid shapes of the chamfer potions face each other, wet draining performance and land portion rigidity are uniform at both sides of the central land portion row 18.

In addition, since a portion of the central land portion row chamfer portion 24 is protruded closer to the central circumferential main groove 14 side than the non-chamfer portion 26, deterioration of land portion rigidity due to forming the central land portion row chamfer portion 24 can be offset.

Here, when the tire axial direction protruding amount t of the central land portion row chamfer portion 24 is less than 2.5% of groove width W3 of the central circumferential main groove 14, effects due to the protrusion are rarely exhibited.

On the other hand, when the tire axial direction protruding amount t of the central land portion row chamfer portion 24 is less than 2.5% of the width W3 of the central circumferential main groove 14, effects due to protruding the chamfer portion 24 are rarely exhibited.

Next, the second land portion rows 32 will be explained.

In the second land portion row 32, since the second land portion row lateral groove 34 at the central circumferential main groove 14 side is the second land portion row narrow-width portion 34A, land portion rigidity of the second land portion row lateral groove 34 (the second land portion row 32) is improved, and block edge motions at both sides of the second land portion row narrow-width portion 34A are lessened, and heel-and-toe wear on the second land portion row 32 can be reduced.

Air volume inside the second land portion row lateral groove 34 having the second land portion row narrow-width portion 34A is decreased, whereby pattern noise is deteriorated.

In the second land portion row 32, since the second land portion row chamfer portion 38 is formed in a region where the second land portion row narrow-width portion 34A is formed, the area of the grooves is increased, and wet performance is more enhanced than in a case in which blocks are not chamfered.

Due to providing the transverse sipes 40 at the second land portion row 32, land portion rigidity is uniformed.

When the depth d2 of the lower edge of the second land portion row chamfer portion 38 is less than 5% of the depth D1 of the central circumferential main groove 14, effects due to chamfering are rarely exhibited.

On the other hand, when the depth d2 of the lower edge of the second land portion row chamfer portion 38 exceeds 30% of the depth D1 of the central circumferential main groove 14, air volume of the second land portion row chamfer portion 38 is increased thereby allowing the second land portion row chamfer portion 38 to function almost in the same manner as a large-width groove. Accordingly, occurrence of heel-and-toe wear or deterioration of pattern noise is induced.

Further, when the tire axial direction width W4 of the second land portion row chamfer portion 38 is less than 15% of the tire axial direction width W5 of the second block 32, the second land portion row large-width portions 34B becomes relatively larger, and heel-and-toe wear easily occurs.

On the other hand, when the tire axial direction width W4 of the second land portion row chamfer portion 38 exceeds 80% of the tire axial direction width W5 of the second block 32, the total air volume inside the second land portion row lateral grooves 34 become insufficient thus deteriorating wet draining performance.

Next, the bilateral land portions rows 42 will be explained.

In the bilateral land portion row 42, since the bilateral land portion row lateral groove 44 at the side circumferential main groove 16 side is the bilateral land portion row narrow-width portion 44A, land portion rigidity of the bilateral land portion row 42 (the shoulder block 46) is enhanced, and motions of block edges at both sides of the bilateral land portion row narrow portion 44A are reduced, whereby heel-and-toe wear in the bilateral land portion row 42 can be suppressed.

Further, since air volume inside the bilateral land portion row lateral grooves 44 having the bilateral land portion row narrow-width portion 44A is decreased, pattern noise is deteriorated.

Moreover, in the bilateral land portion row 42, since the bilateral land portion row chamfer portion 48 is formed in the region where the bilateral land portion row narrow-width portion 44A is formed, the total area of grooves is increased, and wet performance is more enhanced than in the case in which land portions are not chamfered.

Due to providing the first axial direction sipes 50, the second axial direction sipes 52, and the circumferential short sipes 54 on the bilateral land portion row 42, land portion rigidity is uniformed.

Here, as the tire is rotated, and blocks or false blocks are contacted with a road surface, upon a receipt of a compressive force in a tire radial direction, groove walls facing each other are kept in tight contact with each other between the bent portions of the first axial direction sipes 50 and the second axial direction sipes 52. Accordingly, apparent land portion rigidity is enhanced, the collapse of the shoulder blocks 46 can be prevented, and uneven wear of the shoulder blocks 46 can be suppressed.

Since the first axial direction sipes 50 and the second axial direction sipes 52 do not change their directions in the process during which the shoulder blocks 46 are gradually worn out, direction performances of edge effects of sipe portions are not changed.

Further, when the depth d3 of the lower edge of the bilateral land portion row chamfer portion 48 is less than 5% of the groove depth D2 of the side circumferential main groove 16, effects due to chamfering are rarely exhibited.

On the other hand, when the depth d3 of the lower edge of the bilateral land portion row chamfer portion 48 exceeds 30% of the depth D2 of the side circumferential main groove 16, air volume inside the bilateral land portion row chamfer portion 48 is increased thereby allowing the chamfer portion to function in the same manner as a large-width groove, whereby occurrence of heel-and-toe wear or deterioration of pattern noise is induced.

Further, when the tire axial direction width W6 of the bilateral land portion row chamfer portion 48 is less than 15% of the tire axial direction width W7 of the bilateral land portion row 42, the bilateral land portion row large-width portion 44B is relatively increased, whereby heel-and-toe wear easily occurs.

On the other hand, when the tire axial direction width W6 of the bilateral land portion row chamfer portion 48 exceeds 80% of the tire axial direction width W7 of the bilateral land portion row 42, the total air volume inside the bilateral land portion row lateral grooves 44 becomes insufficient, and wet draining performance is deteriorated.

In addition, in the present embodiment, since the direction of the second land portion row chamfer portions 38 and that of the bilateral land portion row chamfer portions 48 are opposed to each other with respect to the tire circumferential direction, noise and resistance to uneven wear are not deviated due to the rotation of the tire.

Moreover, in the present embodiment, the tread pattern forms a point symmetry. However, the tread pattern can be formed bilaterally symmetric with the tire equatorial plane CL as a border.

Second Embodiment

A second embodiment of the present invention will be explained with reference to FIGS. 7 and 8. Further, portions identical to those shown in the first embodiment are denoted by the same reference numerals, and description thereof will be omitted.

Figure 7:
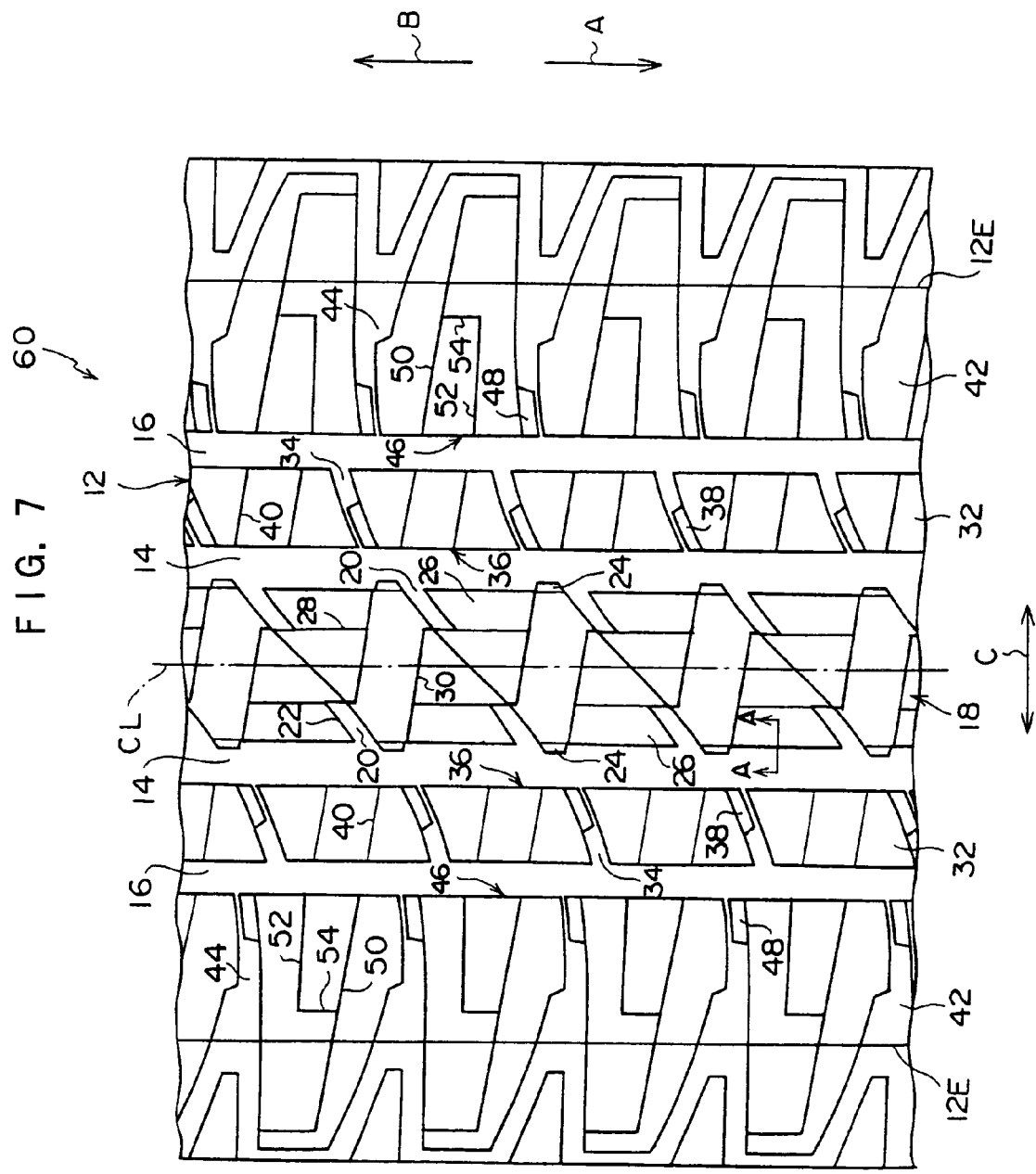
FIG. 7 is a plan view of a tread of a pneumatic tire according to a second embodiment of the present invention.

As shown in FIG. 7, in a pneumatic tire 60 of the present embodiment, the size of the central land portion row chamfer portion 24 is different from that in the first embodiment.

The central land portion row chamfer portion 24 of the present embodiment is formed only at a portion protruding from the edge of the central circumferential main groove 14 side central land portion row non-chamfer portion 26 adjacent thereto in the tire circumferential direction.

Figure 8:
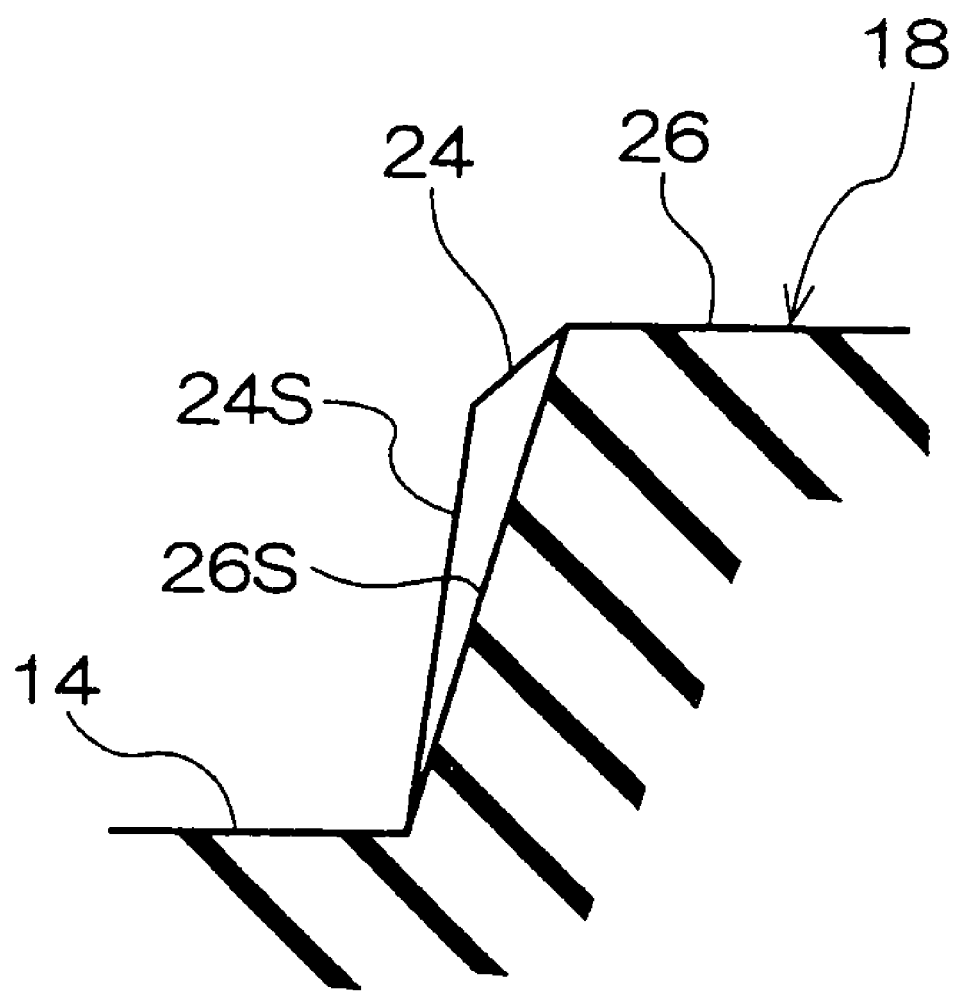
FIG. 8 is a cross-sectional view of the tread shown in FIG. 7 taken along line A-A.

Further, as shown in FIG. 8, the tire axial direction side groove wall 24S of a portion protruding to the central circumferential main groove 14 side of the central land portion row 18 and the tire axial direction side groove wall 26S of the central land portion row non-chamfer portion 26 are connected to the bottom portion of the central circumferential main groove 14 at the same position in the tire axial direction.

(Operation)

In the pneumatic tire 60 of the present embodiment, since the central land portion row chamfer portion 24 is formed only at a portion protruding from the central land portion row 18 to the central circumferential main groove 14, formation of steps in the tire circumferential direction of the central land portion row 18 can be reduced, whereby wear resistance and resistance to uneven wear can be enhanced.

Further, in the central land portion row 18, since the tire axial direction side groove wall 24S of a portion protruding to the central circumferential main groove 14 side of the central land portion row 18 and the tire axial direction side groove wall 26S of the central land portion row non-chamfer portion 26 are connected to the bottom portion of the central circumferential main groove 14 at the same position in the tire axial direction. unevenness of the groove walls can be suppressed, and water in grooves can be flown smoothly.

Further, since the inclination of the groove wall 26S of the central land portion row non-chamfer portion 26 is gentle than that of the wall groove 24S, land portion rigidity of the central land portion row 18 can be enhanced.

TEST EXAMPLES

In order to ensure the effects of the present invention, a pneumatic tire in Example to which the present invention is applied, a pneumatic tire in Comparative Example, and a pneumatic tire in Conventional Example were prepared, a wet hydroplaning test and a dry steering stability test were conducted thereon.

Test methods will be explained hereinafter.

Wet hydroplaning test: a test tire (internal pressure: 230 kPa) was loaded on an actual vehicle (load equivalent to two passengers aboard), a test driver linearly traveled the vehicle on a wet road surface having a water depth of 5 mm. Evaluation was conducted for feeling evaluation at a speed limit of hydroplaning generation during the vehicle travelling on the aforementioned wet road surface, and expressed by an index representation with a conventional example as 100. Note that, it is shown that the larger the value of index, the better the tire performance.

Dry steering stability test: a test tire (size: PSR P235/75R15, tread width: 188 mm, and internal pressure: 230 kPa) was loaded on the actual vehicle (load equivalent to two passengers aboard), and a test driver drove the vehicle by sport driving on a dry circuit course with various driving mode. Evaluation was conducted for feeling evaluation, and expressed by an index representation with a conventional example as 100. Further, it is shown that the larger the value of index, the better the tire performance.

Hereinafter, a description of the test tire will be made.

Example pneumatic tire: the pneumatic tire 10 according to the above-described embodiments. Groove portion width, groove wall angle and groove depth are shown in Table 1 as below.

TABLE 1

| | width (unit: mm) | groove wall angle (to a normal line of tread surface) (unit: degree) | groove width (unit: mm) |
|---|---|---|---|
| central circumferential main groove | 10 | 8 | 10 |
| side circumferential main groove | 8 | 8 | 10 |
| central land portion row lateral groove | 4 | 5 | 9 |
| second land portion row large width portion | 4 | 5 | 9 |
| second land portion row narrow width portion | 1 | 0 | 9 |
| bilateral land portion row large width portion | 4 to 10 | 5 | 9 |
| bilateral land portion row narrow width portion | 1 | 0 | 9 |
| gentle inclining sipe | 0.7 | 0 | 8 |
| inclining sipe | 0.7 | 0 | 8 |
| circumferential sipe | 0.7 | 0 | 3 |
| transverse sipe | 0.7 | 0 | 8 |
| first axial direction sipe | 0.7 | 0 | 8 |
| second axial direction sipe | 0.7 | 0 | 8 |
| circumferential short sipe | 0.7 | 0 | 8 |

Figure 9:
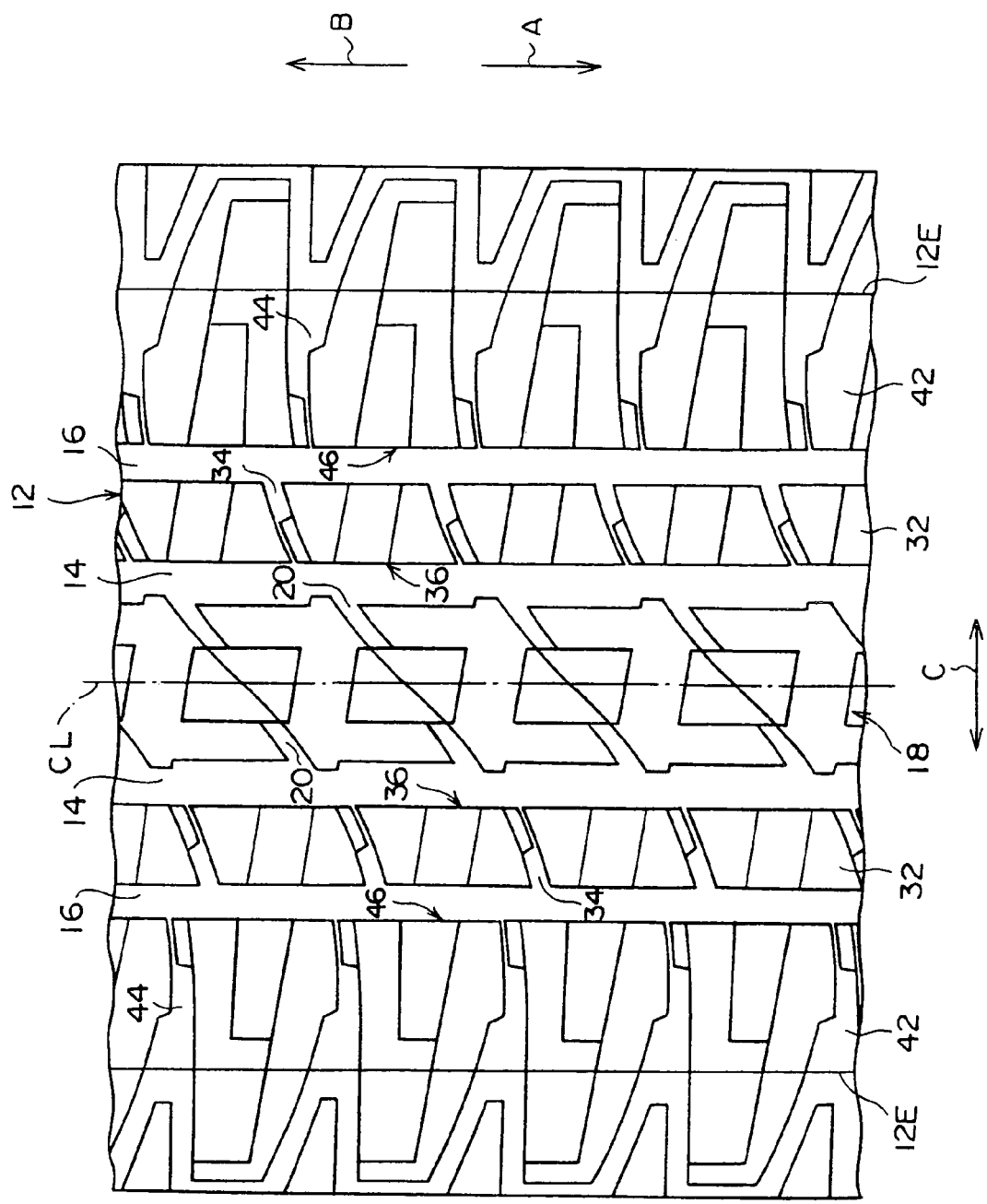
FIG. 9 is a plan view of a tread of a pneumatic tire according to a comparative example.

Comparative Example pneumatic tire: as shown in FIG. 9, Comparative Example pneumatic tire is structured in the same manner as the Example pneumatic tire 10 except for the central land portion row chamfer portion 24 is not formed at the central land portion row 18.

Conventional Example pneumatic tire: as shown in FIG. 10, central circumferential main grooves 114 each extending along the tire circumferential direction are formed at both sides of the tire equatorial plane CL of a tread 112, and side circumferential main grooves 116 each extending along the tire circumferential direction are formed at the tire axial direction outer sides of the central circumferential main grooves 114.

A central land portion row 118, which is defined by a pair of the central circumferential main grooves, is disposed on the tire equatorial plane CL of the tread 112.

Central land portion row lateral grooves 120, each of which is extended from the central circumferential main groove 114 toward the land portion inner side, and is bent and terminated inside the land portions, are formed in the vicinities of both sides of the central land portion row 118.

The central land portion row lateral grooves 120 at the left-hand side and those at the right-hand side thereof in FIG. 10 are connected to each other by central land portion row first sipes 122 and central land portion row second sipes 124.

Further, central land portion row third sipes 126 are formed at the tire circumferential direction sides of the central land portion row lateral grooves 120 of the central land portion row 118.

Second land portion rows 132, which are defined by the central circumferential main grooves 114 and the side circumferential main grooves 116, are disposed at the tire axial direction outer sides of the central land portion row 118.

A plurality of second land portion row lateral grooves 134 crossing in the tire axial direction is formed in the second land portion rows 132, and the second land portion rows 132 are defined into second blocks 136.

A second land portion row first sipe 140 and a second land portion row second sipe 141 are formed in the second land portion row lateral groove 134.

Bilateral land portions rows 142 are disposed respectively at the tire axial direction outer sides of the second land portion rows 132.

A plurality of bilateral land portion row lateral grooves 144 crossing in the tire axial direction is formed in the bilateral land portion rows 142, and the bilateral land portion rows 142 are defined into a plurality of shoulder blocks 146.

A bilateral land portion row sipe 150 extending in the tire axial direction is formed in the shoulder block 146.

Note that, 112E shown in this figure is a tread edge 12E.

Groove portion widths, groove wall angles and groove depths of Conventional

Example pneumatic tire are shown in Table 2 as below.

TABLE 2

|  | width (unit: mm) | groove wall angle (to a normal line of tread surface) (unit: degree) | groove width (unit: mm) |
| --- | --- | --- | --- |
| central circumferential main groove | 9 | 8 | 10 |
| side circumferential main groove | 6 | 8 | 10 |
| central land portion row lateral groove | 4 | 5 | 9 |
| second land portion row lateral groove | 4 | 5 | 9 |
| bilateral land portion row lateral groove | 4 to 10 | 0 | 8 |
| central land portion row first sipe | 0.7 | 0 | 8 |
| central land portion row second sipe | 0.7 | 0 | 8 |
| central land portion row third sipe | 0.7 | 0 | 8 |
| second land portion row first sipe | 0.7 | 0 | 8 |

TABLE 2-continued

|  | width (unit: mm) | groove wall angle (to a normal line of tread surface) (unit: degree) | groove width (unit: mm) |
| --- | --- | --- | --- |
| second land portion row second sipe | 0.7 | 0 | 8 |
| bilateral land portion row sipe | 0.7 | 0 | 8 |

Results of each test are shown in Table 3 as below.

TABLE 3

|  | Conventional Example | Comparative Example | Example |
| --- | --- | --- | --- |
| wet hydroplaning performance | 100 | 101 | 105 |
| dry steering stability performance | 100 | 104 | 110 |

As a result of the test, it is discovered that dry steering stability performance is enhanced without sacrificing wet hydroplaning performance.

INDUSTRIAL APPLICABILITY

As described above, the pneumatic tire according to the present invention is suitable for the use when the tire is put on to a four-wheel vehicle or the like and is desired to enhance wet performance without sacrificing steering stability.

What is claimed is:

1. A pneumatic tire in which at least a pair of circumferential main grooves extending along a tire circumferential direction is formed on a tread, the tread is defined into at least a plurality of land portion rows comprising at least a central land portion row at the tire equatorial plane side and bilateral land portion rows disposed at tire axial direction outer sides of the central land portion row, and a plurality of lateral grooves extending along the tire axial direction is formed in the central land portion row and the bilateral land portion rows, in the tire circumferential direction, wherein the lateral grooves which are formed on at least the central land portion row are extended from land portion both edges to land portion inner sides by at least 15% or more of the central land portion row tire axial direction width, and the central land portion row is defined into blocks or false blocks, and the blocks or the false blocks form chamfer portions, each having a depth gradually increasing toward the circumferential main groove and each facing the circumferential main groove, in surfaces of the tire circumferential direction one side corner portions of the central land portion row, whereby the vicinities of both sides in a tire width direction of the central land portion row are made uneven in the tire circumferential direction, and wherein the central land portion row chamfer portion is formed in the vicinity of an obtuse angled corner portion of the block or the false block as seen from a tread plan view of the block or the false block, is formed into a substantially trapezoid shaped tread plan view configuration whose upside faces the circumferential main groove side and whose base is substantially parallel to the tire circumferential direction, and has a planar shape which is inclined at a constant angle with respect to a tread surface.

2. The pneumatic tire of claim 1, wherein the tire axial direction one side lateral groove of the central land portion row and the tire axial direction other side lateral groove thereof are connected to each other by a first narrow groove whose width is smaller than those of the lateral grooves.

3. The pneumatic tire according to claim 1, wherein a tire axial direction width of the central land portion row chamfer portion is set within a range of from 5 to 30% of that of the central land portion row, and a depth of the tire circumferential main groove side lower edge of the central land portion row chamfer portion is set within a range of from 5 to 50% of that of the tire circumferential main groove adjacent to the central land portion row chamfer portion.

4. The pneumatic tire according to claim 1, wherein a sidewall surface of the central land portion row non-chamfer portion at the central land portion row chamfer portion side is formed at the angle of substantially 90° with respect to the tread surface at a boundary portion between the central land portion row chamfer portion and the central land portion row non-chamfer portion not including the central land portion row chamfer portion.

5. The pneumatic tire according to claim 1, wherein at least a portion of the tire axial direction one side central land portion row chamfer portion and at least a portion of the tire axial direction other side central land portion row chamfer portion are disposed so as to face each other.

6. The pneumatic tire according to claim 1, wherein the central land portion row chamfer portion is protruded closer to the circumferential main groove side adjacent to the central land portion row chamfer portion than the central land portion row non-chamfer portion not including the central land portion row chamfer portion adjacent to the central land portion row chamfer portion in the tire circumferential direction, and a tire axial direction protruding amount of the central land portion row chamfer portion in reference to the circumferential main groove side edge of the central land portion row non-chamfer portion is set within a range of from 2.5 to 40% of a width of the circumferential main groove adjacent to the central land portion row chamfer portion.

7. The pneumatic tire according to claim 6, wherein the central land portion row chamfer portion is formed only at a portion protruding closer to the circumferential main groove side than the central land portion row non-chamfer portion adjacent to the central land portion row chamfer portion in the tire circumferential direction.

8. The pneumatic tire according to claim 6, wherein a tire axial direction groove wall of a portion of the central land portion row protruding to the circum-ferential main groove side and a tire axial direction groove wall of the central land portion row non-chamfer portion are connected to a groove bottom portion of the circumferential main groove substantially at the same position in the tire axial direction.

9. The pneumatic tire according to claim 1, wherein the bilateral land portion row lateral groove comprises a narrow-width portion in which a portion of the tire equatorial plane side lateral groove is formed narrower and a large-width portion in which a remaining portion of the tread edge side lateral groove is formed wider, and a planar chamfer portion, whose tread plane view is formed into a substantially rectangular shaped configuration which is longer along the bilateral land portion row lateral groove, is formed in a region where the narrow-width portion is formed, and inclined at a constant angle, starting from an imaginary extension line of a tread surface side edge of the large-width portion toward the circumferential main groove side adjacent to the bilateral land portion row chamfer portion.

10. The pneumatic tire according to claim 9, wherein the central land portion row is disposed on the tire equatorial plane, a second land portion row, which is defined by each of the circumferential main grooves, is disposed between the central land portion row and each of the bilateral land portion rows, a plurality of lateral grooves extending along the tire axial direction is formed in the second land portion rows in the tire circumferential direction, the second land portion row lateral groove comprises a narrow-width portion in which a portion of the tire equatorial plane side lateral groove is formed narrower and a large-width portion in which a remaining portion of the tread edge side lateral groove is formed wider, a planar chamfer portion, whose tread plane view is formed into a substantially rectangular shaped configuration which is longer along the second land portion row lateral groove, is formed in a region where the narrow-width portion is formed, and inclined at a constant angle, starting from an imaginary extension line of a tread surface side edge of the large-width portion toward the circumferential main groove side adjacent to the second land portion row chamfer portion, and the direction of the second land portion row chamfer portions and that of the bilateral land portion row chamfer portions are opposed to each other with respect to the tire circumferential direction.

11. The pneumatic tire according to claim 9, wherein a lower edge position of the bilateral land portion row chamfer portion is set within a range of from 5 to 30% of a depth of the circumferential main groove adjacent to the bilateral land portion row chamfer portion, and a tire axial direction width of the bilateral land portion row chamfer portion is set within a range of from 15 to 60% of that of the bilateral land portion row width.

12. The pneumatic tire according to claim 1, wherein the block or the false block of the bilateral land portion row is defined into a plurality of sub-blocks by a second narrow groove whose width is smaller than the lateral groove.

13. The pneumatic tire according to claim 12, wherein the second narrow groove has at least two bent portions at the depth direction intermediate portions.

14. The pneumatic tire according to claim 13, wherein the lengthwise direction of the second narrow groove does not change due to a depth size.

* * * * *